United States Patent [19]

Haas et al.

[11] 4,409,157
[45] Oct. 11, 1983

[54] METHOD FOR IMPROVED DECOMPOSITION OF METAL NITRATE SOLUTIONS

[75] Inventors: Paul A. Haas; William B. Stines, both of Knoxville, Tenn.,

[73] Assignee: The United States of America as represented by the U.S. Department of Energy, Washington, D.C.

[21] Appl. No.: 226,576

[22] Filed: Jan. 21, 1981

[51] Int. Cl.³ .............................................. G21C 21/00
[52] U.S. Cl. .................................... 264/0.5; 252/631; 252/643; 423/15
[58] Field of Search ...................... 252/627, 631, 643; 264/0.5; 423/11, 12, 15, 16, 32, 33, 56, 67

[56] References Cited

U.S. PATENT DOCUMENTS

| 3,514,412 | 5/1970 | Triggiani et al. | 252/643 |
|---|---|---|---|
| 3,725,293 | 4/1973 | Haas | 252/643 |
| 3,862,296 | 1/1975 | Dotson et al. | 252/631 |
| 3,911,076 | 10/1975 | Probert et al. | 432/32 |
| 4,065,300 | 12/1977 | Poarch | 432/32 |
| 4,187,280 | 2/1980 | Morschl et al. | 423/11 |
| 4,225,455 | 9/1980 | Haas | 423/11 |
| 4,247,495 | 1/1981 | Ennerst et al. | 264/0.5 |
| 4,261,934 | 4/1981 | Hart et al. | 264/0.5 |

OTHER PUBLICATIONS

Chalder, G. H., et al., "The Fabrication and Properties of Uranium Dioxide Feed," Report P/192 Canada, pp. 590–604, 2nd Geneva Conference 1958, Session E-18, also, Atomic Energy of Canada Limited, Report 602.
Sloat, R. J., et al., "Processing Alternatives for Uranium-Plutonium Co-conversion," Report NEDG-21951, Oak Ridge, National Laboratory, Oak Ridge, Tennessee (1978), 28 pages.
Dotson, J. M., et al., "Technical Development of the Coprecal (Coprecipitation-Calcination) Co-conversion Process," AI. Ch.E. 89th National Meeting, Portland, Oregon, Aug. 17–20, 1980, 21 pages.
Lewis, College Chemistry, Barnes & Noble Books, New York, 1971, pp. 282, 296, and 300.

Primary Examiner—Leland A. Sebastian

[57] ABSTRACT

A method for co-conversion of aqueous solutions of one or more heavy metal nitrates wherein thermal decomposition within a temperature range of about 300° to 800° C. is carried out in the presence of about 50 to 500% molar concentration of ammonium nitrate to total metal.

2 Claims, 8 Drawing Figures

|←— 100 μm —→|

|←— 100 μm —→|

Fig. 1a

|←—100 μm—→|

METHOD FOR IMPROVED DECOMPOSITION OF METAL NITRATE SOLUTIONS

FIELD OF THE INVENTION

This invention relates to the art of thermal decomposition of heavy metal nitrate solutions and more particularly to the co-conversion of such metal nitrates to their corresponding metallic oxides by concentration and denitration of said solutions.

It is particularly useful for producing powders of mixed oxide nuclear fuels which are free-flowing, easily compacted, and compositionally acceptable for fabrication of nuclear fuel pellets.

This invention is a result of a contract with the United States Department of Energy.

For the purposes of this disclosure, metallic oxides shall refer to oxides of uranium, plutonium, cerium, and thorium wherein the ratio of oxygen atoms to heavy metal atoms is not necessarily two to one, but shall approximate said ratio.

BACKGROUND OF THE INVENTION

Production of ceramic-grade metal oxide powders containing mixed values of heavy metals has been a formidable problem for industrial and nuclear fuel operators handling aqueous nitrate solutions in their processes. It has particularly been a problem in preparing nuclear fuel for fast neutronic reactors utilizing uranium, thorium, plutonium, and their combinations with each other or with rare earth elements, such as cerium. Mixed nuclear fuels are desirable as a means to reduce the threat of proliferation of nuclear weapons.

If stolen or otherwise diverted, significant upgrading of these fuels would be necessary to obtain weapons-grade nuclear material since it is diluted or denatured with non-fissionable materials or rare earth elements. Typically, mixed nuclear fuels have been coprocessed by precipitation and thermal decomposition processes. Alternatively, they have been prepared in similar processes in isolated form followed by blending of the product powders in a final mixed fuels fabrication step. This alternative process is objectionable because diversion prone purified metal solutions or oxides are present in the processes in isolated form. While precipitation and decomposition processes can operate with denatured fuel mixtures, these coprocessing technologies frequently involve solids handling operations which are messy, dust prone, and cost or energy intensive. The most objectionable aspects of these operations have the dust generation caused by slurry transfers of precipitates, powder pretreatment for pellet fabrication, and dimensional correction of the fabricated pellet. Because of the radioactivity and toxicity of nuclear fuels of the actinide series, these operations must be carried out in remotely operable facilities which are not amenable to dusty processes. Additionally, materials accountability and criticality control are seriously hampered in such processes. Therefore, the economic and commercial feasibility of large-scale nuclear fuel coprocessing and recycling facilities would be significantly enhanced by the elimination or reduction of dust-generating procedures.

Ceramic pellets for nuclear fuel applications must meet rigid specifications. It has been difficult to consistently produce pellets from decomposition or precipitation processes which meet all of the requisite properties for fuel quality pellets. While these processes can individually produce some of these properties, they cannot produce all of them in combination. Often, the oxides of these processes must be modified with binders, additives, lubricants, or pore formers to produce acceptable compacts. However, these additives have constituents which are not suitable for reactor exposure. Thus, many fabricated pellets are still rejected after extensive costs are incurred for chemical additives, specialized preparation, or sizing procedures. These rejections are usually based on non-attainment of a satisfactory combination of the following properties: uniform composition, dimensional precision, high sintered density, good mechanical strength, and high thermal conductivity. Without such properties, an irradiated fuel pellet cannot withstand mechanical and thermal impact or stresses to which it may be subjected during its service life. Undesirable side effects may be distortion, bloating, spalling, and release of residuals which could cause fuel rod failure and subsequent contamination of the reactor cooling system.

The novelty of the present invention lies in the discovery of a conversion process utilizing thermal decomposition of concentrated metal nitrates to produce powders possessing precipitation-like characteristics for fabrication of fuel quality pellets. This is accomplished by the simple and inexpensive addition of ammonium nitrate to the heavy metal solutions followed by thermal decomposition in the temperature range of about 300° to 800° C. An unexpected advantage of such addition is the derivation of good quality ceramic powders without actual precipitation or the associated increase in production and auxiliary equipment to handle, monitor, and control coprecipitation technology and its wastes.

SUMMARY OF THE INVENTION

It is an object of the present invention to provide a method for the decomposition of heavy metal solutions by thermal means to directly produce ceramic quality powders suitable for immediate conversion to nuclear fuel pellets having values of mixed metal oxides.

Another object of the invention is to provide such a method which is amenable to remote operation while being relatively free from volatile and airborne contaminants which requires a minimum of auxiliary processing equipment or associated waste streams.

Still another object of the invention is to provide such a method that involves only minimal addition of inexpensive chemicals without any detectable adverse effects on the resulting powders, to produce a powder having a B.E.T. surface area of about 5–15 $m^2/g$, and a predominant particle size of less than 10 microns.

It is a further object of the invention to provide such a method that produces a ceramic pellet of high mechanical strength and integrity with a uniform composition of mixed metal oxides throughout having a density in excess of 90% of the theoretical crystalline density.

Another object of the invention is to provide a process operable on the product stream from a nuclear fuels reprocessing facility to produce fuel pellets with a minimum of intermediate steps to thereby eliminate, reduce, or ameliorate intensive powder treatment or pellet dimensional correction processes to achieve savings of manpower, energy, and environmental expenditures.

These and other objects are achieved according to the method of our invention by concentration and denitrating nuclear fuel solutions through the application of a heating means thereto while a sufficient amount of ammonium nitrate is added to the decomposing solution to produce metal oxide powders containing one or more metals of suitable quality for direct compaction and sintering into nuclear fuel pellets capable of satisfying rigid nuclear fuel specifications without additional treatment.

A sufficient amount of ammonium nitrate is defined as that quantity necessary to obtain a precipitation-like ceramic powder at the end of the solution decomposition process without achieving actual precipitation. Typically, ammonium nitrate additions of 0.5 to 5.0 $NH_4^+$/metal molar compositions are sufficient. The ceramic powders of the present invention do not retain chemical contaminants or neutron capture elements within them which would make them undesirable for reactor use. Ammonium nitrate is an inexpensive and readily available chemical which produces a waste in the process contemplated herein that is compatible with other waste streams for nuclear reprocessing facilities or which can be neutralized and recycled by relatively simple procedures known in the art.

Powders of superior quality are routinely produced by the method of this invention with only a minimum of process steps and complications. We have found that the application of heat in the range of 300° to 800° C., and preferably 350°–600° C., is adequate to produce a relatively uniform powder having a B.E.T. ($N_2$ adsorption) particle surface area of 5 to 15 $m^2$/g, and an average particle size of less than 10 microns for 50 to 90% of the oxide material. These powders are thus free-flowing, easily handled, and processed by well-known procedures such as cold pressing. Particles size deviations, such as coarse particles, fines, glassy chards, or slurries are therefore not a problem with the present invention. Intensive enhancement procedures, such as blending, screening, jet grinding, granulating, and other dust-generating pretreatment procedures, are fortuitously eliminated. Accordingly, operating, maintenance, and decontamination procedures within remotely operable facilities are eliminated or substantially reduced by the present method. Hence, the remotely operable facilities employed in our process are more reliable and utilize less complex equipment.

Acceptable fuel pellets or compacts can be prepared from the powders derived by the method of this invention through conventional pellet-pressing techniques known in the art of nuclear fuel making without resorting to expensive binders, additives, pore formers, and lubricants as required in the prior art.

Powders of our method can be fabricated into ceramic pellets essentially free from visible cracks, laminations, gross porosities, and non-cylindrical shapes. Therefore, dimensional shaping, sizing, and control steps are unnecessary or held to a minimum. Adoption of the method of our invention to existing nuclear fuel reprocessing schemes will involve a minimum of process modifications because of the simplicity and compatibility of our process, its associated equipment and waste streams.

Compacts derived by our invention have the unique advantage of being easily sintered at conventional temperatures and in conventional environments to higher densities than heretofore obtained on a routine basis. Using the addition of about 0.5 to 50. $NH_4^+$/total metal molar concentrations of ammonium nitrate, we have obtained theoretical densities from about 89 to 93% of the corresponding metallic oxides after sintering to about 1450°–1700° C. For neutronic reactor applications, this sintered density is superior to the 68 to 72% T.D. pellets heretofore obtained for metal oxides from thermal decomposition. Despite as many as seven dust-intensive, dimensional correction steps, or the addition of expensive binders, prior art pellets were incapable of meeting fuel specifications and often sustained high rejection rates. Thus, our method of producing fuel pellets from co-processed solutions of heavy metals is contemplated as sufficient to produce substantial economic savings in energy, manpower, and capital costs.

BRIEF DESCRIPTION OF THE DRAWINGS

FIG. 1 is a micrograph (200X) of a mixed nuclear fuel powder (U/U+Th=0.75) derived in batch thermal decomposition processes. The granulated powder of FIG. 1a was obtained by ammonium nitrate addition while the large, glassy particles of FIG. 1b (prior art) were obtained without the addition of ammonium nitrate.

FIG. 2 is a photomicrograph (200X) of uranum dioxide pellets formed by conventional fuel fabrication procedures. Depicted in FIG. 2a (prior art) is the type of microstructure obtained using powders produced from continuous denitration processes following product enhancement procedures to produce acceptable feed powders.

FIG. 3 is a photomicrograph (200X) of the microstructures of uranium dioxide pellets derived from a batch denitration process. FIG. 3a (prior art) shows the microstructure obtained using powder produced without ammonium nitrate addition while

DETAILED DESCRIPTION

In accordance with the invention, co-conversion of a solution containing mixed heavy metal values is accomplished by thermal decomposition of the solution within a temperature range of about 300° to 800° C. in the presence of an amount of ammonium nitrate sufficient to produce mixed oxide powders suitable for immediate conversion to nuclear fuel pellets without further processing. Preferably, the decomposition process is carried out within a temperature range of about 350° to 600° C. and in a $NH_4^+$/total metal molar concentration of about 0.5 to 5.

Our method has principal application to a dilute nitrate solution containing mixed values of the actinide series metals, particularly uranium, plutonium, and thorium. These metals and their combinations with each other or with the rare earth metals series may be utilized for industrial or nuclear fuel purposes. Our invention works as well on simple as on complex multicomponent systems. Dilute nitrate solutions suitable for providing feed to the process of our invention are typically found in the product streams of nuclear fuel reprocessing schemes such as those utilizing the Purex Process, a more complete description of which can be found in Long, *Engineering for Nuclear Fuel Reprocessing*, Gordon and Beach Publishing Co. New York, N.Y. (1967). Other sources of dilute nitrate streams containing nuclear fuel values are possible, however, and are contemplated as equivalent to the disclosure herein rendered.

The successful combination of the desirable features of the thermal denitration and precipitation processes of the prior art, as accomplished by our invention, produces a ceramic powder superior to those obtained from the individual processes alone. Further, the ceramic properties of our powders exceed the sum of those properties attainable by addition of the prior art processes. This is most radically demonstrated by a 15 to 25% increase in the sintered density of the final product pellet. Sintered densities of our loadable fuel pellets have ranged from about 89–93% of the theoretical crystalline density of the metal oxide as compared to 67 to 76% T.D. in the prior art of thermal denitration. Additionally, the sintered pellets of our invention exhibit better microstructures with fewer voids and defects than those observed for conventional denitration processes. While the prior art might attain any one of the foregoing properties at any given time, it could not produce the combination of properties attainable by our process.

Our discovery that the simple addition of a sufficient amount of ammonium nitrate (0.5 to 5.0 ammonium nitrate to metal) is all that is necessary to produce quality ceramic powders in a thermal denitration process is not obvious. Nor would it be expected that such addition would result in a powder capable of direct compaction into a loadable fuel pellet without the powder intensive pretreatment steps of the prior art to enhance the physical characteristics of the powder. Further, it is surprising that the pellets formed of our powders lack the micro and macro defects heretofore experienced in fuel fabrication that necessitated dimensional sizing and frequently resulted in rejection based upon reactor standards.

We have found our process to be amenable to practically any type of thermal denitration equipment. Thus, direct addition to existing nuclear fuel reprocessing plants can be accomplished with a minimum of process modifications. While various equipment could be utilized to produce our desired heating range of about 300° to 800° C., we have found that a rotary kiln with internal breaker bars to assist in heat transfer to the powder while avoiding the formation of large agglomerates is preferable. This piece of equipment would fill the major portion of space required for our fired process. Since precipitation slurries and hard fired-agglomerates are avoided in our process, we can eliminate the auxiliary process equipment, monitoring instrumentation, and waste treating equipment necessary for precipitation and thermal decomposition processes of the prior art. Thus, our method can accomplish significant cost savings in equipment, energy, and manpower.

A uniformly dispersed mixed metal oxide is produced according to our process by agitation of the process feed following ammonium nitrate addition. Such agitation is continued through the concentration and denitration procedures by the kiln breaker bars and rotating motion.

For carrying out our method in a commercial-scale operation, a preferred method would be to supply the initial $NH_4NO_3$ as a recycle stream from a previous process cycle. We believe this can easily be accomplished since our process wastes are normally oxides of nitrogen and water vapor which can conveniently be used to reform nitric acid. This, in turn, can be neutralized with ammonia to produce ammonium nitrate useful in our process. Ammonia can also be utilized to neutralize excess $HNO_3$ in the metal nitrate feed solution to form process depletable $NH_4NO_3$ to make the solutions less corrosive during concentration and decomposition stages. Clearly, all wastes of our process are compatible with traditional reprocessor wastes and will not further complicate those systems to which it has been added. Of course, additional inexpensive materials may have to be added as determined by appropriate mass balance but their addition is not viewed as economically prohibitive or as having an adverse effect on process efficiency. A steady state, continuous operation of a large-scale nuclear fuel processing facility is thereby rendered more feasible by use of our process.

Our discovery of $NH_4NO_3$ addition to standard, thermal denitration technology unexpectedly modifies the nitrate decomposition reaction. Our results indicate it is more stable and predictable thereafter for generating consistent product yields. This occurs by controlling the solution behavior by formation of a series of stable complexes. While not much is known of the true mechanisms for the modified reactions of our process, we present the following unbalanced equation to depict the overall effects.

$$Me(NO_3)_a + NH_4NO_3 + HNO_3 \xrightarrow[300-800°\,C.]{\Delta}$$
$$MeO_2 + H_2O\uparrow + NO_2\uparrow + NO\uparrow + N_2O\uparrow + N_2\uparrow + O_2\uparrow$$

where
Me is at least one heavy metal value and
a is an integer from about 2 to 4

The decomposition products of the foregoing reaction are simply processed using conventional technologies to produce recyclable materials, such as nitric acid, ammonium nitrate, and non-toxic, non-condensible gases. Alternatively, these products may be routed to other waste streams of the nuclear fuels reprocessing facility since the waste streams are compatible. This was not always true with wastes from prior art technology which frequently required expensive auxiliary waste collection, recovery, and treatment equipment that had to be maintained apart from the usual waste streams of a nuclear fuels reprocessor to avoid undesirable contamination and inoperability of unit operations.

By addition of ammonium nitrate to aqueous solutions containing heavy metal values, we have found that the resultant solution and product powder has new and different properties that are not predictable from the observable results of the uncombined processes themselves when subjected to the same temperature range of about 300° C. to 800° C. While proper handling and storage of ammonium nitrate additive must be observed, we have not experienced any adverse effects in its use and have, in fact, found that its exothermic decomposition in our process provides some heat for the endothermic nitrate decomposition. Thus, some energy savings are accomplished by the use of this additive alone. If excess $HNO_3$ exists in the metal nitrate feed solution, we have observed that denitrations in stainless steel equipment often results in corrosion and excessive concentrations of Fe, Cr, and Ni oxides in the final fuel pellet. This contamination is undesirable and can be avoided by neutralization of the excess $HNO_3$ with ammonia to form $NH_4NO_3$ thereby eliminating corrosion of equipment and the possibility of corrosion product oxides in the $UO_3$ pellet. Additionally, energy intensive comminution, dimensional control, and auxiliary equipment operations for airborne contaminant control and precipitation slurry handling processes are avoided through the use of the method of our invention to accomplish even more savings. Our invention also reduces additive chemical costs in the form of eliminating or minimizing expenditures for pore formers, binders, or lubricants to be utilized in pellet formation.

Thermal analysis of the process of our invention has provided significant information about the decomposing solution and the resultant powder product. First, such investigation has confirmed that an actual precipitation product is not formed in the practice of the method of our invention. We have learned by thermal gravimetric analysis (TGA) that an equivalent composition to $NH_3UO_2(NO_3)_3$ is formed which is more stable than either $UO_2(NO_3)_2$, or $NH_4NO_3$ alone. This results in no decomposition until a temperature of about 315° C. is reached. At this point, the nitrate decomposition takes place with a loss of about 37 wt.%. Between 315° C. and about 525° C., we have found the gradual loss of an additional 3 wt.%. At about 575° C., the $O_2$ from $UO_3$ to $UO_2$ is lost to produce a total weight loss at about 600° C. of about 41.7 wt.%. Differential scanning calorimetry has produced profiles similar to those for TGA with one large endotherm indicated at about 280° C. Evolved gas mass spectrometric analysis (EGA-MS) has also produced similar results indicating the largest peak at about 280° C. of masses 14 ($N^+$ from $NO_3^-$ or $NH_3^+$), mass 18 ($H_2O$), mass 28 ($N_2^+$), mass 30 (NO), and mass 44 ($N_2O^+$). Similar analysis of conventional thermal denitration solutions and of pure $NH_4NO_3$ decompositions have led to the conclusion that the solutions modified by our invention follow a different decomposition process than either $NH_4NO_3$ or metal nitrate solutions. However, the true behavior lies somewhere in between due to the formation of stable complexes which do not exist in the separate decompositions.

Figure 1A:
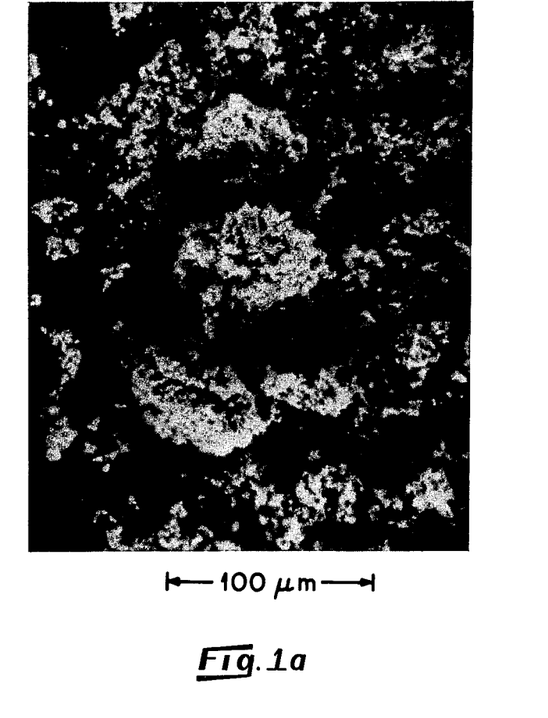
Figure 1B:
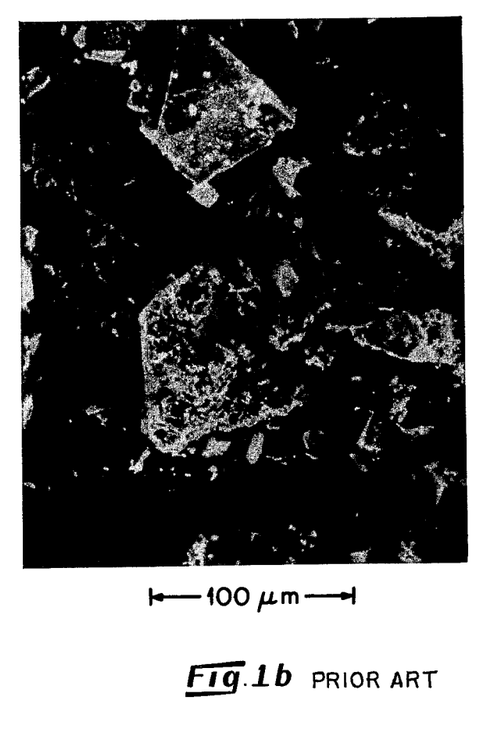

An illustration of the enhancement of powder products from a conventional thermal denitration process afforded by the addition of ammonium nitrate is provided in FIG. 1. A nitrate solution containing 75 wt.% uranium and 25 wt.% thorium was decomposed as a batch process within a glass dish. FIG. 1a shows the ceramic powder produced by addition of ammonium nitrate to total metal in a molar ratio concentration of 0.6 mole/mole. Analysis of the material shown in this scanning electron micrograph disclosed a B.E.T. ($N_2$ adsorption) surface area of 7.8 $m^2/g$ and a bulk density of 0.8 $g/cm^3$. The grainy texture of this material appears to be free flowing and easily compacted without dust evolution in a typical fuel fabrication process. FIG. 1b shows the product obtained without ammonium nitrate addition in an otherwise identical process. The products of the two processes are markedly different in appearance, with the difference being attributable to the addition of $NH_4NO_3$. The micrograph of FIG. 1b is characterized by large, glassy shards which are hard, difficult to compact, and require movement of a considerable amount of material to fill the voids under compaction because of the absence of good grains. This material of the lower plate had a B.E.T. surface area of 17.5 $m^2/g$ and a bulk density of 2.3 $g/cm^3$. As can be expected, considerable powder pretreatment procedures must be performed on this material to produce acceptable feed for conventional fuel fabrication processes. In comparison, the powder derived by the practice of our invention as shown in FIG. 1a would require minimal pregranulation, if at all, to make it easier to handle because of the low bulk density. However, dust evolution from its handling or processing would be at an absolute minimum.

To further illustrate and demonstrate the effectiveness of our invention and its operable modes, we present the following examples. Although we have not optimized the process conditions for commercial scale operations, the necessary optimization could be easily accomplished without undue experimentation by one skilled in the art. Therefore, our examples are for the purposes of illustration and description and are not intended to be limiting. While the examples demonstrate the use of U, Pu, Ce, and Th in nuclear fuels, we contemplate the use of other actinide elements and rare earths as the equivalents of this method and they may be substituted in whole or in part with only minor adjustments in process parameters.

EXAMPLE I

A continuous denitration utilizing ammonium nitrate according to this invention was carried out in a rotary denitration kiln of about 8 cm diameter and approximately 90 cm in length. This kiln was prepared from commercially available schedule 10 stainless steel pipe. Positioned concentrically around this pipe was a 30 cm tube furnace to act as a source of heat for the middle third of the kiln. Drive means and monitoring equipment were attached to the kiln to provide rotation and analysis of the operating conditions. To promote solids movement and discharge, the kiln was provided with a 4° slope from the horizontal with the discharged solids being collected at the lower end. Affixed scrapper and breaker bars of about 1 to 2 cm in thickness and of the kiln length were installed inside to minimize accumulation of solids and the formation of large build-ups.

A 1.4 molar uranium nitrate and 3.0 molar ammonium nitrate charge were introduced to the upper end of this denitrating kiln at a flow rate of 12 $cm^3/min$. With a tube furnace temperature of 650° C., we obtained a kiln temperature of 530° C. at its center. This is within the preferred operating range of 300°–800° C. of our invention. Discharged solids were a free-flowing, orange-gray powder.

Examination of this powder revealed acceptable ceramic properties for fuel fabrication as a pellet. A bulk density of 0.79 $g/cm^3$ and a 9.24 $m^2/g$ B.E.T. surface area was determined on subsequent analysis. Chemical analysis indicated a minimal retention of nitrate of about 0.75 wt%. Upon heating to about 900° C., we found that this powder lost only about 3.3 wt.%.

Calcination of the powder at 600° C. was performed to remove remaining volatiles and to reduce the oxides from $UO_3$ to $UO_2$. This involved heating the powder from room temperature to about 600° C. and maintaining that temperature for about four hours in a 96% Ar-4% $H_2$ atmosphere. The heat source was removed and the powder cooled to room temperature under an argon atmosphere.

Pellets having a green density of about 41% of the theoretical crystal density of $UO_2$ were easily formed from the cooled powder. Binders, additives, or pore fillers were not required to form the pellets at 241 MPa (35 Kpsi). These pellets were sintered at about 1450° C. for four hours in a 96% Ar-4% $H_2$ environment followed by cooling at room temperature in an argon environment. We have found that a heating schedule of about 300° C./hr to about 900° C. and of about 100° C/hr from about 900° C. to about 1450° C. is beneficial for this task.

Visual inspection of the sintered pellets did not reveal any cracks, laminations, noncylindrical shapes, or gross porosities. Final density of the pellets was 91.8% and 92.2% T.D. The pellets had good smooth, shiny surfaces and appeared to be of adequate ceramic quality for loadable fuel. This is especially true since the specification for fuel pellets is 91 ±3%.

Mass balance of the process disclosed that about 0.1 wt.% of the $NH_4^+$ feed was retained in the solid product without any observable adverse effects. About 1 wt.% of the $NH_4^+$ was monitored in the condensate stream leading to the conclusion that greater than 98 wt.% of the $NH_4^+$ decomposed to $N_2$, $N_2O$, $H_2O$ and $O_2$.

The above denitration procedures were repeated omitting the ammonium nitrate to demonstrate the effectiveness of this additive according to our invention. Immediately observable differences occurred in the process caused by solids caking and build-up problems in the kiln. Only after thermal cycling of the kiln center from about 470°–540° C., by varying the tube furnace temperature from about 540°–650° C., were we able to maintain a reasonable solids discharge although at a fluctuating rate.

This conventionally denitrated product was a medium yellow solid consisting of mixed powder and hard shards. Subsequent analysis revealed a lower quality ceramic product had been produced having a bulk density of about 2.5 g/cm³ (300% increase over invention) and a 0.89-m²/g B.E.T. surface area. Chemical analysis indicated a retained nitrate content of about 0.79 wt.% and a loss upon heating to 900° C. of about 2.64 wt.%.

Before calcination we ground the solids mixture to a more reactive and workable powder. The heat procedures and pressing methods of the preceding examples were followed to produce a green density pellet of 52.9% T.D. that sintered to 68.9% and 68.8% T.D. of $UO_2$ (26% reduction over invention). Visual observation and inspection of these pellets revealed they did not have the good appearance or ceramic properties of those prepared by the method of our invention. The conventionally denitrated pellets did not appear to be of fuel quality and were inferior to standards of 91 ±3%.

Figure 2A:
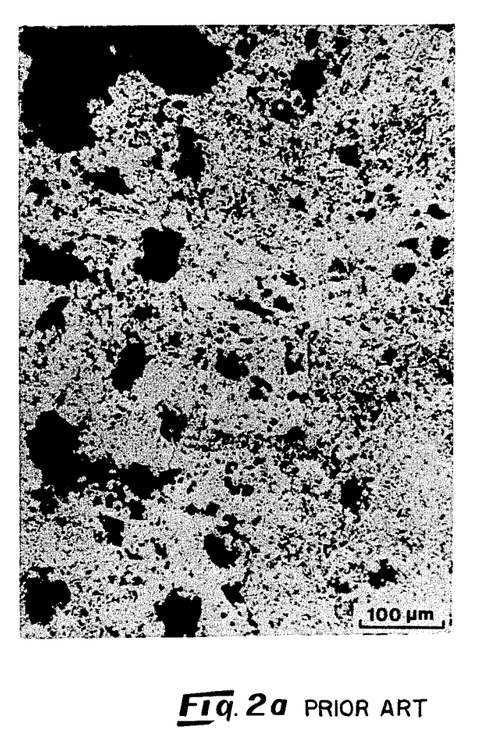
Figure 2B:
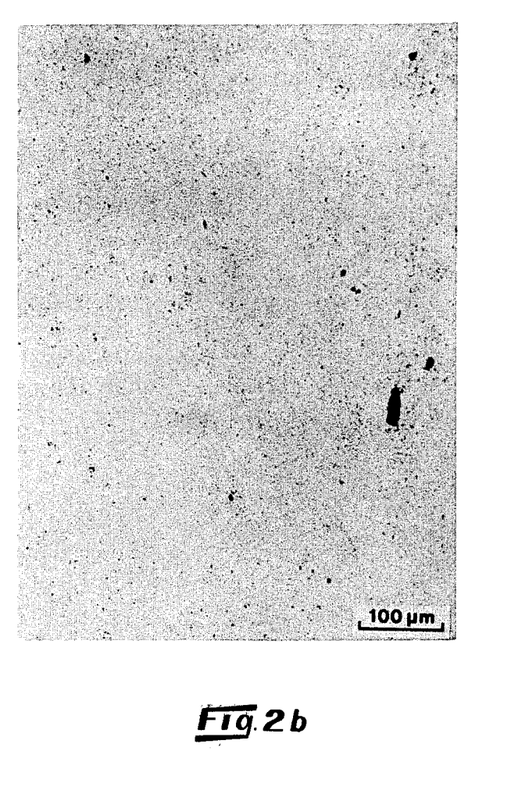
FIG. 2b shows the type of microstructure derived by adding ammonium nitrate according to the process of the present invention.

FIG. 2 is a photomicrograph of the pellet structures prepared in the foregoing experiment. FIG. 2a depicts large voids and defects which can occur when ammonium nitrate is not added per our invention. FIG. 2b depicts the more favorable results in pellet microstructure obtained by the practice of our invention and ammonium nitrate addition.

A series of additional, continuous denitrations were carried out to evaluate the effects of various amounts of ammonium nitrate on thermally decomposed solutions of uranium nitrate at various concentrations and temperatures. The results are shown in the summary form of Table I.

Our study of the uranium system revealed the formation of complexes of double salts during the decomposition process. While our data for other systems did not clearly establish such stabilizing complexes, we believe that mixed oxide fuels will generally follow this behavior since uranium will probably be the predominant component of such fuels. The following series of unbalanced reaction equations is representative of the overall denitration and calcination processes according to our invention.

TABLE I
CONTINUOUS DENITRATION RESULTS

| Test ROT No. | Kiln Temp. (°C.) | Powder Characteristics | | | Pellet Density % of Theoretical Density | Feed Concentrations | | | Solids Discharge Behavior |
|---|---|---|---|---|---|---|---|---|---|
| | | B.E.T. Surface Area (m²/g) | Bulk Density (g/cm³) | Wt. % Loss on Ignition | | $NH_4^{+a}$/U (Mole/Mole) | $U^+$ (M) | $NO_3^{-b}$/U (Mole/Mole) | |
| 42 | 490 | 1.6 | 1.6 | — | — | 0 | 1.7 | 2.1 | Poor |
| 7 | 570 | 0.7 | 2.0 | — | — | 0 | 1.4 | 2.0 | Unacceptable |
| 19 | 390 ± 10* | 1.8 | 1.1 | 8 | 78 | 0.8 | 1.7 | 2.0 | Poor |
| 18 | 420 ± 20* | 3.9 | 0.8 | 10 | 92 | 1.2 | 1.7 | 2.0 | Poor |
| 32 | 400–460 | 6.4 | 1.0 | 13 | 89 | 1.3 | 1.7 | 2.1 | Good |
| 39 | 440 | 8.2 | 0.6 | — | 92 | 1.3 | 1.7 | 2.1 | Good |
| 26 | 200–490 | 11.3 | 0.8 | — | 91 | 2.0 | 1.7 | 1.6 | — |
| 37 | 390 | 8.7 | 0.8 | — | — | 2.0 | 1.7 | 2.1 | Excellent |
| 34 | 450 | 8.0 | 0.9 | 6 | 92 | 2.0 | 1.7 | 2.0 | Excellent |
| 17 | 490 | 8.6 | 0.9 | 5 | — | 2.0 | 1.7 | 2.0 | — |
| 41 | 620 | 9.1 | 0.8 | 2 | 93 | 2.0 | 1.7 | 2.1 | — |
| 24 | 490 | 11.8 | 0.6 | 5 | 92 | 2.0 | 1.7 | 3.0 | — |
| 25 | 560 | 9.9 | 0.7 | 4 | — | 2.0 | 1.7 | 3.0 | — |
| 90 | 350 | 10.2 | 0.8 | 7 | 92 | 2.1 | 1.4 | 2.0 | — |
| 40 | 450 | 8.0 | 0.7 | — | 91 | 3.0 | 1.7 | 2.0 | Excellent |

*Temperature Cycled to Promote Solids Discharge
[a]Ratio Greater than 1.0 necessary for $NH_4UO_2(NO_3)_3$ Formation
[b]Does Not Include Nitrate from $NH_4NO_3$

EXAMPLE II

The continuous denitration procedures of Example I were repeated with simple uranium being replaced with mixed metal feed solutions. Table II is a tabular representation of the results of these tests for production of mixed oxide nuclear fuels. As can be observed from comparison of Tables I and II, the results for continuously processed single or mixed oxide fuels are similar in our process.

TABLE II

| | CONTINUOUS DENITRATION RESULTS FOR MIXED OXIDES | | | | | |
|---|---|---|---|---|---|---|
| Additive | Uranium Composition (mole/mole) | $NH_4^+$/metal (mole/mole) | Tube Temp. (°C.) | Pellet Density % of T. D. | B.E.T. Surface Area ($M^2$/g) | Bulk Density (g/$cm^3$) |
| Thorium | 3.0 | 2.0 | 430 | 91 | 13.7 | 0.7 |
| Thorium | 3.0 | 2.0 | 500 | 92 | 15.6 | 0.5 |
| Thorium | 0 | 2. | 540 | 83 | 23.6 | 0.7 |
| Thorium | 0 | 5. | 550 | 85 | 25.8 | 0.8 |
| Thorium | 0.33 | 2.0 | 540 | 84 | 17.9 | 0.7 |
| Cerium | 3.0 | 2.0 | 460 | 85 | 6.0 | 0.7 |

EXAMPLE III

A feed solution containing about 0.28 moles of U, 0.62 moles of $NH_4^+$, and 1.08 moles of $NO_3^-$ and was batch denitrated in a glass dish by overnight heating in an oven at about 330° C. Visual inspection of the product through a microscope the next morning revealed a very soft, tan-orange cake that was easily converted to a fine powder. Upon weighing, the solid product was found to weigh about 82.4 grams. Subsequent analysis revealed a bulk density of 0.75 g/$cm^3$ and a B.E.T. surface area of about 4.91 $m^2$/g.

Calcination and pellet-pressing procedures of Example I were repeated to produce a green pellet density of about 43.3% of theoretical density. Sintering of the pellet to the temperatures of Example I produced product pellets having theoretical densities of 90.7 and 90.9%. These pellets appeared to be of loadable quality with no visual defects.

The procedures of the preceding test were repeated without the addition of $NH_4^+$. Absence of the ammonium radical produced a very hard, tan-brown cake of glassy or lava-like appearances weighing 81.7 g. Subsequent examination of the product agglomerate revealed a B.E.T. surface area of 3.02 $m^2$/g and a bulk density of 1.48 g/$cm^3$. Ceramic properties of the agglomerate were enhanced by grinding and blending before the material was calcined and pelletized. Green densities of 49% were increased to 75.5 and 73.3% T.D. upon sintering.

A comparison of these results indicates that a 2.2 $NH_4^+$/U molar ratio addition to the denitrated solution feed can accomplish a 50% reduction in bulk density, a 1.6 increase in B.E.T. surface area, and a 23% increase in final sintered density of the product pellet.

Figure 3A:
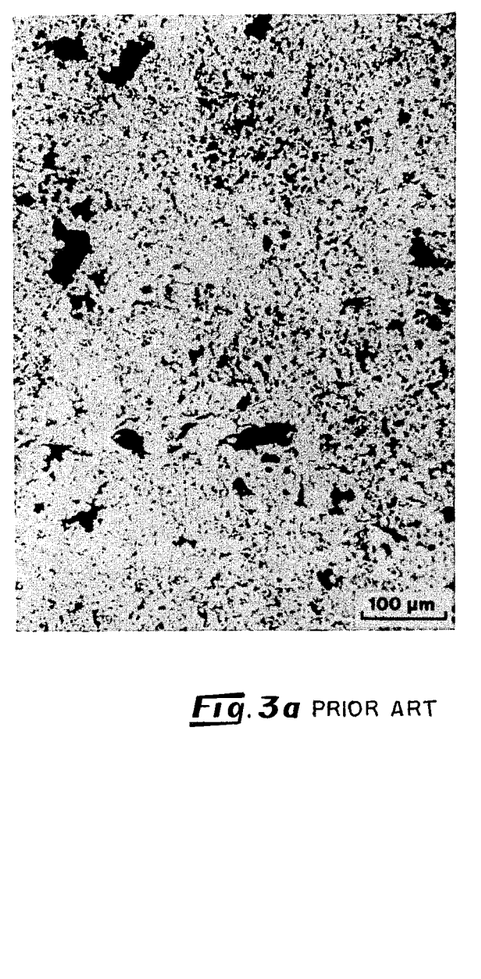
Figure 3B:
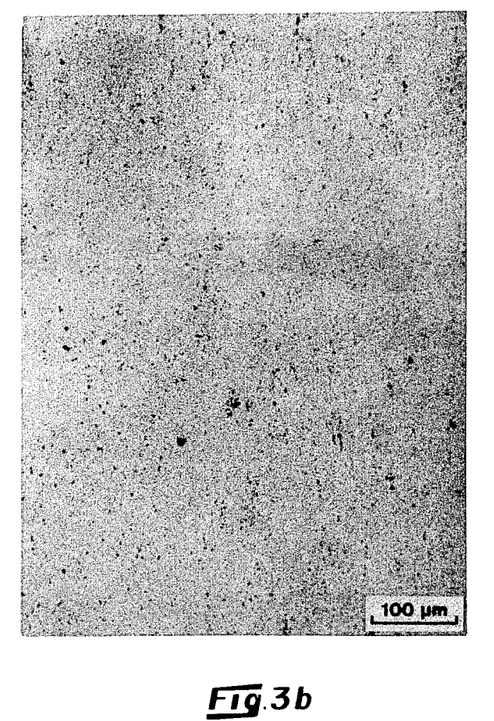
FIG. 3b depicts the resulting microstructure obtained by using ammonium nitrate addition.

FIG. 3 is a photomicrograph of pellet structures formed in the preceding example. FIG. 3a demonstrates that large voids and defects are created within a pellet fabricated from a pretreated powder of a conventional denitration process. By the addition of ammonium nitrate, the more favorable microstructure of FIG. 3b can be produced under the same circumstances without intensive powder enhancement or expensive compact additives.

A series of additional batch denitrations were carried out to evaluate effects of mixed metal and ammonium nitrate concentrations on producing acceptable fuel-quality ceramic powders. The results of these tests are summarized in Table III.

TABLE III

| | BATCH DENITRATION RESULTS | | | | | |
|---|---|---|---|---|---|---|
| Additive | Uranium Composition (Mole/Mole) | $NO_3^-$/Metal % of Stoichiometric$^a$ | $NH_4^+$/Metal (Mole/Mole) | B.E.T. Surface Area ($m^2$/g) | Bulk Density (g/$cm^3$) | Pellet Density % Theoretical Density |
| Uranium | 1 | 100 | 0 | 3.0 | 1.5 | 76 |
| | 1 | 100 | 2 | 4.9 | 0.8 | 91 |
| | 1 | 80 | 0.6 | — | 1.2 | — |
| | 1 | 0 | 2 | 6.8 | 0.9 | 93 |
| Cerium | 0.33 | 100 | 0 | 0.6 | 0.9 | — |
| | 0.33 | 100 | 2 | 28.9 | 0.9 | — |
| | 0.33 | 0 | 2 | 1.9 | 1.7 | — |
| Thorium | 0.33 | 100 | 0 | 17.5 | 2.3 | 68 |
| | 0.33 | 80 | 0.6 | 7.8 | 0.8 | — |
| | 0.33 | 0 | 2 | 33.4 | 1.5 | — |
| Thorium | 3.0 | 60 | 0.5 | — | 1.2 | — |
| Thorium (Pure) | (No U) (Infinity) | 100 | 0 | 53.9 | 1.9 | — |
| | | 100 | 2 | 33.6 | 0.6 | 90 |
| | | 3 | 0 | — | 2.7 | — |
| | | 10 | 4 | 7.1 | 2.0 | 72 |

$^a$Does Not Include $NO_3^-$ From $NH_4NO_3$

EXAMPLE IV

A mixed nuclear fuel solution was batch denitrated according to our invention to demonstrate its effectiveness preparing mixed oxide metal fuels by direct coprocessing.

A feed solution containing about 0.283 moles of uranium, 0.094 moles of thorium, 0.83 moles of $NH_4^+$, and 1.66 moles of nitrate was batch denitrated in a glass dish by overnight heating in an oven at about 330° C. This feed solution simulates a Th-$U^{233}$ fuel cycle with the $U^{233}$ denatured by the addition of $Th^{238}$. Such dilution in coprocessed nuclear fuels is necessary to discourage pilferage and fuel cycle diversion to nuclear weapons manufacture.

Visual examination of the product revealed a soft, foamy cake having a tan color and easily reduced to about 107 g powder by stirring with a spatula. Ceramic properties of the powder were found to be about 0.71 g/$cm^2$ bulk density and a B.E.T. surface area of about 8.32 $m^2$/g.

Preparation of pellets according to the above procedures produced green pellet densities of 40.7% that sintered to 84.3% and 84.6% T.D. of (U,Th)O₂. No structural micro or macro defects were observed in the product pellets which appeared to be of loadable fuel quality.

EXAMPLE V

A large-scale demonstration test of our process was carried out on a continuous basis utilizing a 16 cm rotary kiln of a uranium production plant. This kiln had a 65 cm furnace disposed about in in a manner similar to the apparatus of Example I. A discharge rate of about 3.0 kg/hr was maintained in our runs and the kiln feed was sufficient to produce this amount of product at different operating conditions. Table IV is a tabular summary of the operating parameters and results of this test. In runs 1 and 2, ammonium nitrate was included in the feed and the characteristics for the product powders and compacted pellet from the powders are comparable to those reported results for the smaller kiln of Experiment I.

It is thus seen that a novel and continuous process for denitrating aqueous streams containing heavy metal values is readily provided by carrying out said denitration in the presence of ammonium nitrate in a molar ratio concentration ranging from 0.5 to 5.0 of the metal nitrates present in solution. The resultant product powder of this invention is effective for conventional fuel fabrication processes with little or no further treatment. Pellets prepared from this powder are useful in direct loading processes for neutronic reactor applications. The foregoing is a relatively simple and highly successful conversion process for making feasible and economic the coprocessing of mixed nuclear fuels in a commercial scale facility.

Various modifications and substitutions will, of course, be apparent to those skilled in the art of nuclear fuel making. Such equivalents, however, may be adopted without departing from the spirit and scope of the appended claims.

TABLE IV
ROTARY KILN DEMONSTRATION RESULTS

| Run No. | $NH_4^+/U$ (mole/mole) | $NO_3^-/U^a$ (mole/mole) | Kiln Temp. (°C.) | Pellet Characteristics Pellet Density % of T. D. | B.E.T. surface area m²/g | Wt. % Loss on Ignition to 900° C. | Bulk Density g/cm³ |
|---|---|---|---|---|---|---|---|
| 1 | 2.0 | 2.0 | 605 | 93 | 7.2 | 1.2 | 0.8 |
| 2 | 2.1 | 1.9 | 460 | 94 | 6.3 | 6.0 | 0.7 |
| 3 | 0 | 3.9 | 750 | 67 | 0.9 | 0.4 | 1.8 |
| 4 | 0 | 4.0 | 605 | 69 | 1.5 | 3.5 | 1.8 |
| 5 | 0 | 3.9 | 445 | 68 | 0.7 | 2.6 | 1.9 |

[a]Does not include $NO_3^-$ from $NH_4NO_3$
Less than 2 = Acid Deficient
Greater than 2 = Excess $HNO_3$

What is claimed is:

1. A method for co-conversion of an aqueous solution containing heavy metal nitrates, selected from the group consisting of uranium, plutonium, thorium, and their combinations, to produce the corresponding metal oxide in a substantially anhydrous state which is capable of directly producing loadable quality nuclear fuel pellets comprising the step of contacting said solution with ammonium nitrate for sufficient time at a temperature in the range of about 300° to 800° C. and in an amount sufficient to provide a molar ratio of ammonium nitrate to total heavy metal in the solution of about 0.5 to 5.0 for effecting the production of metal oxides having a B.E.T. ($N_2$ absorption) surface area of 5–15 m²/g, a predominant (50 to 90%) average particle size of 10 microns or less, and a sinterability to a metal oxide of 91 ±3% of the corresponding theoretical crystal density.

2. An improved process for preparing co-processed nuclear fuel pellets suitable for direct loading in a nuclear reactor which comprises adding to a nuclear fuel solution containing heavy metal nitrates an amount of ammonium nitrate sufficient to effect a molar ratio of ammonium nitrate to total metal in the solution of about 0.5 to 5.0, evaporating the resultant solution at about atmospheric pressure within a temperature range of about 300° C. to 800° C. to produce a nuclear-fuel powder in oxide form of precipitation-like quality having a B.E.T. surface area ($N_2$ adsorption) of 5–15 m²/g, with about 50 to 90% by weight of the powder having a particle size of less than about 10 microns, and a theoretical density of about 91 ±3% upon compaction and sintering, compacting the resulting powder, sintering the compacts at a temperature of about 1450° to 1700 C.° in a reducing atmosphere, and recovering the powder as nuclear fuel pellets.

* * * * *